Nov. 5, 1968 P. B. H. ROBINSON ET AL 3,409,304

SOUND REPRODUCING APPARATUS

Filed Sept. 27, 1965

4 Sheets-Sheet 1

Nov. 5, 1968 P. B. H. ROBINSON ET AL 3,409,304

SOUND REPRODUCING APPARATUS

Filed Sept. 27, 1965 4 Sheets-Sheet 2

Nov. 5, 1968 P. B. H. ROBINSON ET AL 3,409,304

SOUND REPRODUCING APPARATUS

Filed Sept. 27, 1965 4 Sheets-Sheet 4

United States Patent Office 3,409,304

Patented Nov. 5, 1968

3,409,304
SOUND REPRODUCING APPARATUS

Paul Baron Henn Robinson, 26 Four Ashes Road, Bentley Heath, Knowle, Solihull, England, and Anthony Alfred James Homer, 116 Dorridge Road, Dorridge, Solihull, England Filed Sept. 27, 1965, Ser. No. 490,569
3 Claims. (Cl. 274—39)

ABSTRACT OF THE DISCLOSURE

The invention provides a record player in which the disc is supported on one side by spaced guide wheels and a drive wheel, and centered and located by a pressure spigot engaged in the disc center from the opposite side, thus enabling the disc to be driven satisfactorily in any spacial position.

This invention has reference to sound reproducing apparatus for the playing of record discs hereinafter termed "record players" and has for its primary object to provide a record player which dispenses with the need for a turntable for rotating the record disc to be played.

Accordingly the invention consists of a record player in which the record disc is adapted to be rotated by positively driven friction means which is in contact with one side of the record disc and in which pressure-applying means is adapted to operate on the opposite side of the record disc whereby for playing purposes the record may be pinched between the said positively driven friction means and pressure-applying means and so caused to rotate when the positively driven friction means is itself caused to rotate.

The invention also resides in record players constructed, arranged and adapted for use substantially as will be described hereinafter.

An embodiment of the invention will now be described with particular reference to the accompanying drawings which illustrate the invention as applied to a record player constructed, arranged and adapted to operate in general substantially as disclosed in our United States patent application Serial No. 485,350.

Figure 1:
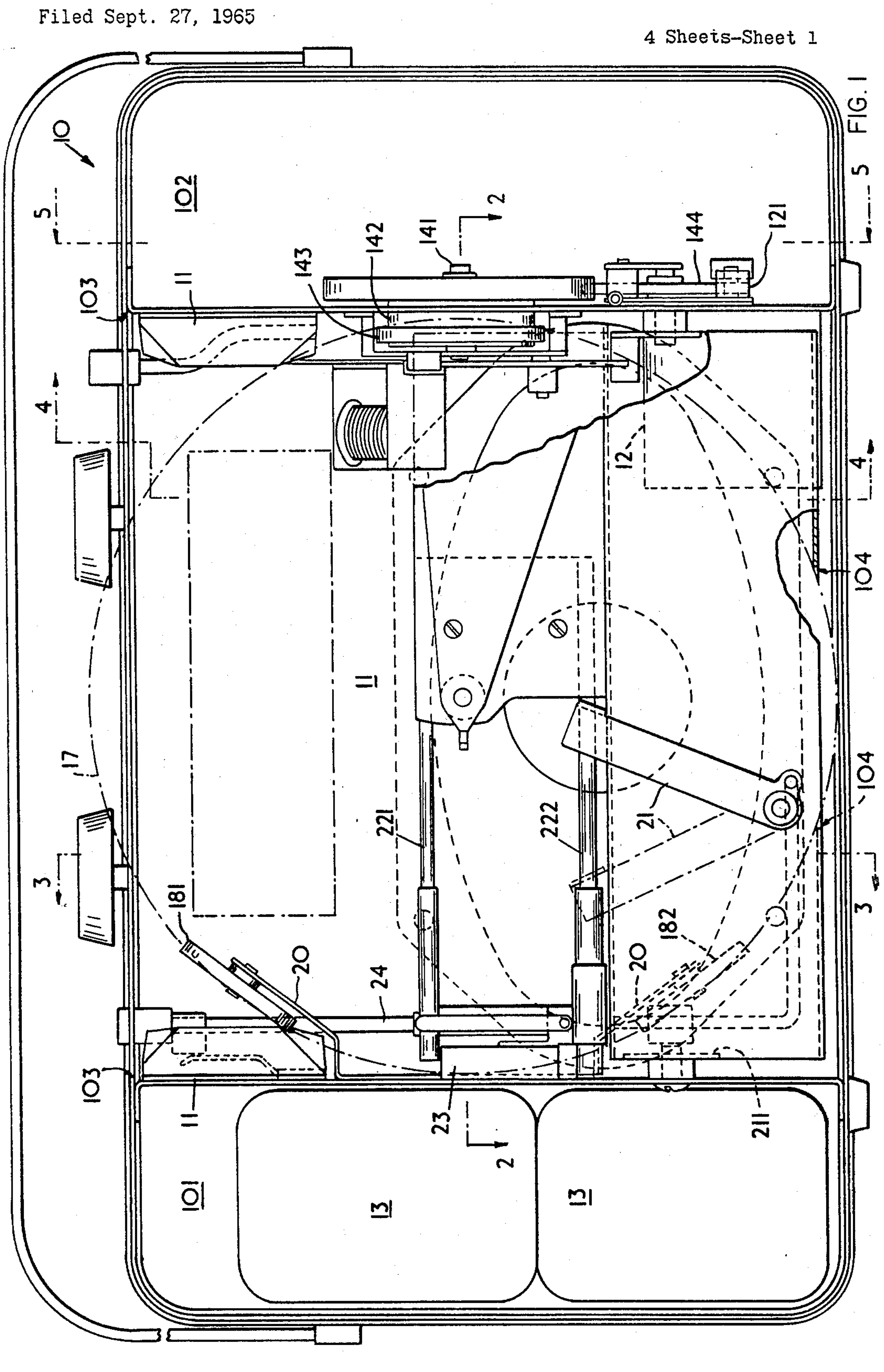
FIGURE 1 is a rear view of the record player as set for playing with the back of the casing removed and with parts omitted where desirable for the sake of clearness.

In the drawings sufficient only of the mechanism is shown as is necessary to an understanding of the invention having regard to the disclosures contained in our United States patent applications Ser. Nos. 485,296 and 485,350.

Further in the drawings like numerals of reference are used to designate similar parts in the several views.

According to the illustrated embodiment of the invention the record player incorporates a casing 10 within which is mounted a chassis 11 at the bottom of one end of which is mounted an electric motor 12 which is adapted to derive electrical energy from one of a pair of electric dry storage batteries 13 disposed within a compartment 101 formed at one end of the casing 10.

The rotor shaft 121 of the electric motor 12 projects into a compartment 102 at the opposite end of the casing 10 to that within which the batteries 13 are contained. The periphery of the projecting end portion of the rotor shaft 121 is in fritcional driving contact with a friction wheel 144 the periphery of which is maintained in frictional contact with the periphery of a flywheel 14 under the action of a pair of pivotally mounted links 151, 152 in conjunction with a spring 16. The flywheel 14 is rotatably mounted on an axle 141 which is supported from the adjacent end of the chassis 11. The flywheel 14 is formed with an integral boss 142 which is located on the inside of the wall of the chassis 11 at that end where the electric motor 12 and flywheel 14 are mounted. The integral boss 142 aforesaid is provided with a rubber tyre 143 which is adapted to contact the inner face of the record 17 when in position for playing as is indicated in FIGURE 2.

Figure 2:
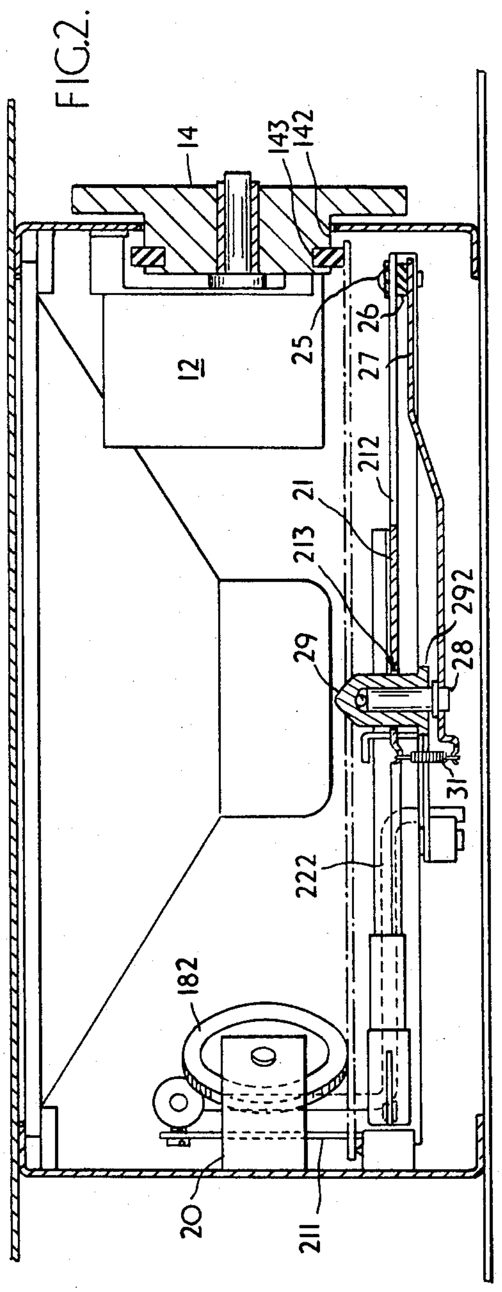
FIGURE 2 is a section taken on the plane indicated by the line 2—2 in FIGURE 1 looking in the direction of the arrows to the said line.
Figure 3:
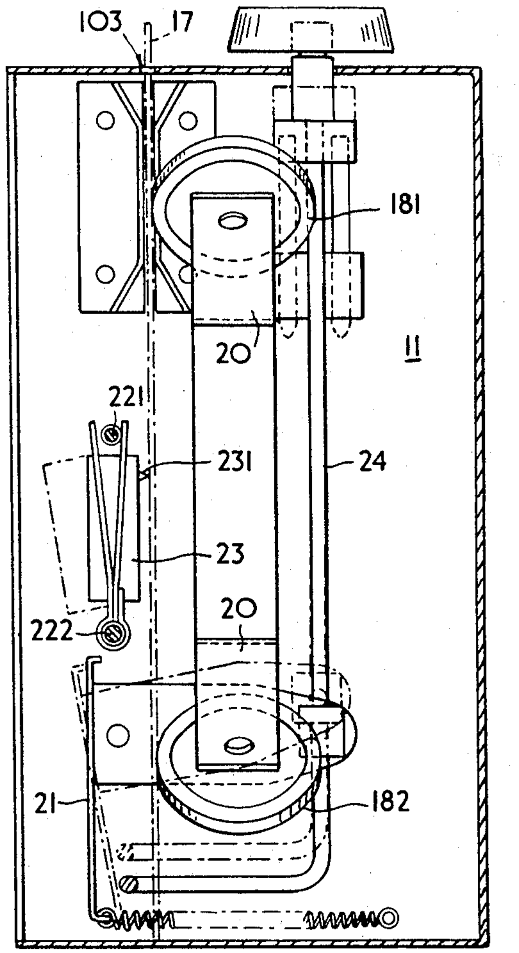
FIGURE 3 is a section taken on the plane indicated by the line 3—3 in FIGURE 1 looking in the direction of the arrows to the said line.
Figure 4:
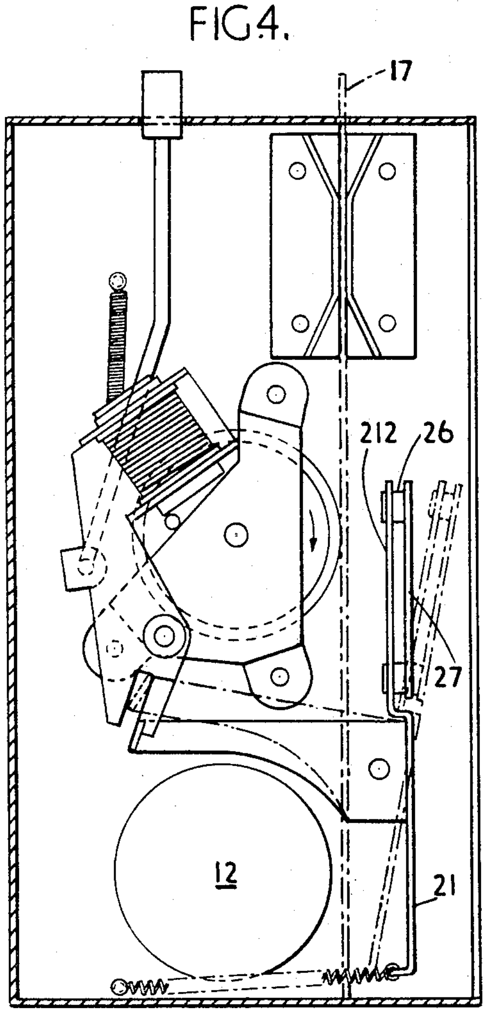
FIGURE 4 is a section taken on the plane indicated by the line 4—4 in FIGURE 1 looking in the direction of the arrows to the said line.
Figure 5:
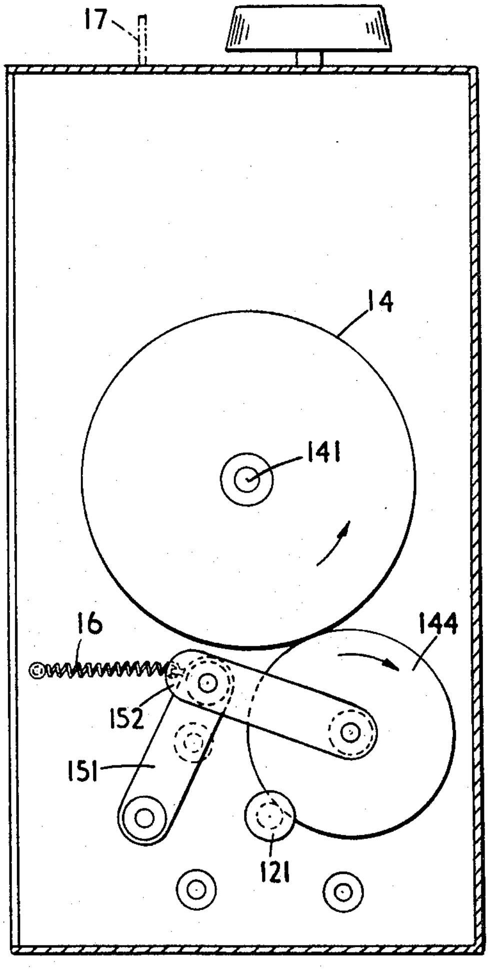
FIGURE 5 is a section taken on the plane indicated by the line 5—5 in FIGURE 1 looking in the direction of the arrows to the said line.
Figure 6:
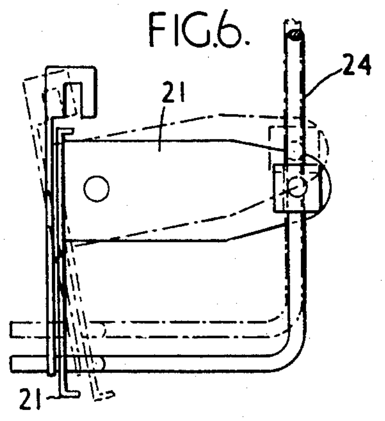
FIGURE 6 is a fragmentary view illustrative of the manner of effecting the tilting of the carrier plate utilised in the construction illustrated in FIGURES 1 to 5, and FIGURES 7 and 8 are fragmentary views on an enlarged scale illustrative of the action of the spigot on which the record discs are mounted for playing purposes.

At the opposite end of the chassis 11 to that at which the flywheel 14 and rubber-tyred boss 142 are disposed is a pair of inclined rubber-tyred guide wheels 181, 182 which are rotatably supported by brackets 20 fixed to the chassis 11 and which are adapted to engage the same side of the record disc 17 as is engaged by the rubber tyre 143 of the boss 142, see FIGURES 1 and 2.

The record disc 17 to be played is inserted through a slot 103 in the top of the casing 10 and upon insertion the record disc 17 drops until the lower portion of the periphery thereof rests on steps 104 in the bottom of the chassis 11.

Pivotally mounted within the chassis 11 is a carrier plate 21 provided with a pair of parallel rods 221, 222 on the lowermost of which namely that designated 222 is slidably mounted a carriage carying a pick-up cartridge 23 adapted for linear travel as disclosed in our aforesaid United States patent applications Ser. Nos. 485,296 and 485,350.

The carrier plate 21 is adapted to be tilted into the record playing position by means of a crank arm 211 integral with the said carrier plate 21 in conjunction with a manually controlled push rod 24 the lower end of which is pivotally connected to the said crank arm 211.

Secured to an extension 212 of the carrier plate 21 at one end thereof through the medium of screws 25 and spacer grommets 26 is a triangular plate 27 which is cranked so that the innermost portion thereof is spaced from the presented face of the extension 212.

Fixed to the inner end of the triangular plate 27 hereinafter termed the spring plate 27 is an inwardly directed pin 28 the inner end portion of which is engaged within the bore 291 of a conically nosed spigot 29 having a flange 292 of greater diameter than that of a hole 213 in the extension 212 through which the conical nose of the spigot 29 is adapted to project. A bearing ball 30 is inserted in the bore 291 so as to constitute an anti-friction bearing between the pin 28 and the end of the bore 291 in the conically nosed spigot 29. The common longitudinal axis of the pin 28 and of the conically nosed spigot 29 is located in the same vertical plane as the centre of the customary hole 171 in the record disc 17 when seated on the steps 104 aforesaid.

Figure 8:
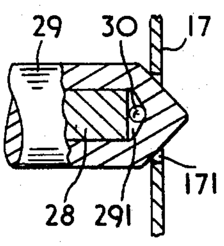

The extension 212 and spring plate 27 are interconnected by a light spring 31 which tends to cause the conical nose of the spigot 29 to exert pressure on the central portion of the record disc 17 when in the playing position, see FIGURES 2 and 8.

The carrier plate 21 is associated with means for latching the carrier plate 21 in the playing position and for automatically unlatching the said carrier plate 21 on the completion of the playing of a record disc 17 but a detailed description of the latching and unlatching means is not essential to an understanding of the present invention particularly as a detailed description of the said latching and unlatching means is disclosed in our United States patent applications Ser. Nos. 485,296 and 485,350 aforesaid.

For playing purposes the record disc 17 is first inserted through the slot 103 so that the lower portion of the periphery thereof rests on the steps 104 as aforesaid. In this position the inner surface of the record disc 17 is in light contact with the rubber tyre 143 on the boss 142 and with the peripheries of the guide wheels 181, 182.

When playing is to commence the push rod 24 is depressed to start the electric motor 12 and to tilt the carrier plate 21 and so cause the stylus 231 of the pick-up cartridge 23 and associated parts to approach the face of the record disc 17 to be played.

Figure 7:
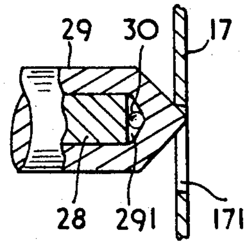

Initially the tilting of the carrier plate 21 causes the nose of the spigot 29 to enter the hole 171 in the record disc 17 and since this is not then in alignment with the axis of the spigot 29 to occasion a slight lifting of the record disc 17 off the steps 104, see FIGURE 7. Subsequently with the record disc 17 rotating the conical nose of the spigot 29 is caused to project further into the hole 171 in the record disc 17 and to centralise the record disc 17 thereon and to exert pressure on the central portion of the record disc 17 and so cause the record disc 17 to be pinched between the nose of the spigot 29 acting at the center of the disc, and the rubber tyre 143 and guide wheels 181, 182, acting near the rim of the disc, thereby occasioning a friction driven rotation of the record disc 17.

Means is provided for disengaging the spigot 29 from the hole 171 in the record disc 17 as and when required.

It is to be appreciated that a record player in accordance with the invention dispenses with the need for a turntable and that by providing means for holding a record disc 17 in the playing position any standard or conventional record disc 17 may be played regardless of the disposition of the apparatus so that in the case of a portable record player of a size comparable to a transportable wireless receiving apparatus the record player may be played whilst carried by one hand or slung from the shoulder in a similar manner to such transportable wireless receiving apparatus.

Although the invention has been described more particularly as applied to transportable record players as disclosed in our United States patent applications Ser. Nos. 485,296 and 485,350 it is to be understood that if desired the invention may be applied to record players generally.

We claim:

1. In a record player constructed and arranged to employ standard record discs, the player including positively driven friction means for rotating a disc and being also provided with pressure applying means engaging the center of the disc about the hole thereof on one side face of the disc, the said disc-rotating friction means being located to engage the opposite side face of the record disc near the periphery thereof, supporting means for engaging the record disc on the same side face as said disc-rotating friction means and spaced about the periphery of the disc from said friction driving means, and also a carriage, a stylus for sound reproduction of recorded material of the disc, said stylus being mounted on said carriage, and said pressure applying means being also mounted on the carriage for effecting application of the stylus, and means for moving the carriage to take said pressure applying means and stylus in and out of engagement with the disc.

2. In a record player as claimed in claim 1, the provision of said pressure applying means comprising a spigot, a sleeve freely rotatable and mounted on said spigot, said spigot having a conical nose to engage in the said center hole of the disc.

3. In a record player as claimed in claim 1, the provision of an elongated plate secured at one end to the carriage, said plate carrying the pressure applying means at the end of the plate opposite to the end secured to the carriage, spring means urging the pressure applying means relative to the carriage and towards the disc, and bearing means interposed between the disc engaging pressure means and said plate.

References Cited

UNITED STATES PATENTS

| | | | |
|---|---|---|---|
| 1,940,089 | 12/1933 | Harrison | 274—9 |
| 2,391,784 | 12/1945 | Johnston | 274—9 |

LEONARD FORMAN, *Primary Examiner.*

FELIX J. D'AMBROSIO. *Assistant Examiner.*